(No Model.) 3 Sheets—Sheet 2.

G. B. ROBINSON & W. R. ROBY.
BICYCLE.

No. 510,820. Patented Dec. 12, 1893.

WITNESSES:
F. McArdle
C. Sedgwick

INVENTORS
G. B. Robinson
BY W. R. Roby
Munn & Co
ATTORNEYS.

(No Model.) 3 Sheets—Sheet 3.

G. B. ROBINSON & W. R. ROBY.
BICYCLE.

No. 510,820. Patented Dec. 12, 1893.

WITNESSES:
F. McArdle
C. Sedgwick

INVENTORS
G. B. Robinson
W. R. Roby
BY
Munn & Co
ATTORNEYS.

UNITED STATES PATENT OFFICE.

GEORGE B. ROBINSON AND WILLIAM R. ROBY, OF COLORADO SPRINGS, COLORADO, ASSIGNORS TO GEORGE B. ROBINSON AND BETHIA E. ROBY, OF SAME PLACE.

BICYCLE.

SPECIFICATION forming part of Letters Patent No. 510,820, dated December 12, 1893.

Application filed January 11, 1893. Serial No. 458,045. (No model.)

*To all whom it may concern:*

Be it known that we, GEORGE B. ROBINSON and WILLIAM R. ROBY, of Colorado Springs, in the county of El Paso and State of Colorado, have invented a new and Improved Bicycle, of which the following is a full, clear, and exact description.

Our invention relates to improvements in bicycles and especially to the driving gear of "safety" bicycles.

The object of our invention is to produce a simple and convenient differential gear mechanism which may be applied to any ordinary "safety," and by which the speed and power of the machine may be changed at will without dismounting, and also to improve the details of the construction of the gear so as to provide a positive and easily working arrangement for turning one of the sprocket wheels on the pedal shaft faster than the shaft itself.

To these ends our invention consists in certain features of construction and combinations of parts, as will be hereinafter described and claimed.

Reference is to be had to the accompanying drawings forming a part of this specification, in which similar figures of reference indicate corresponding parts in all the views.

Figure 1:
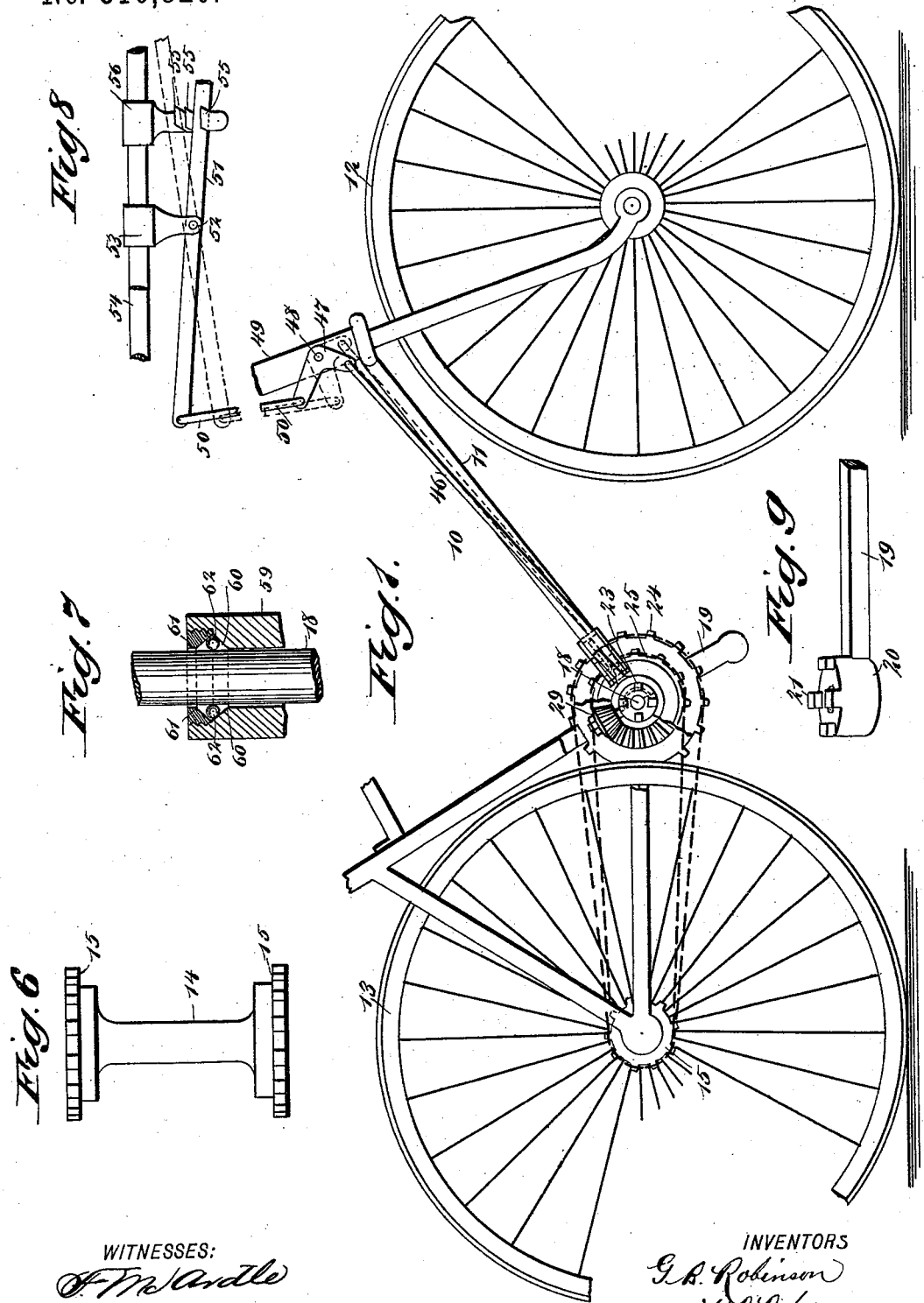
Figure 2:
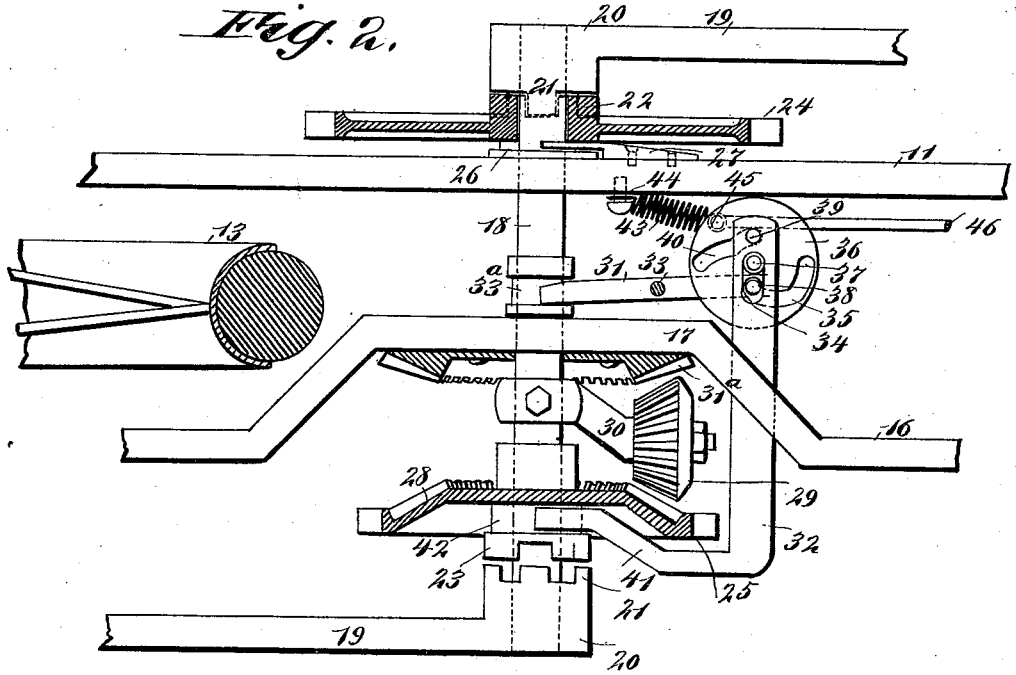
Figure 3:
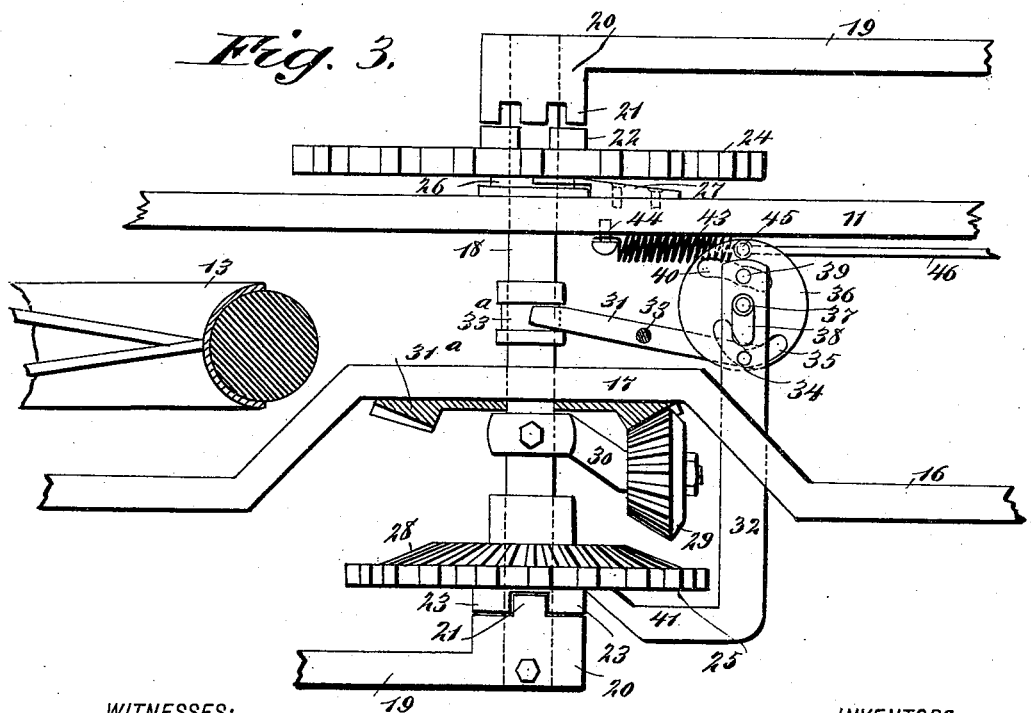
Figure 4:
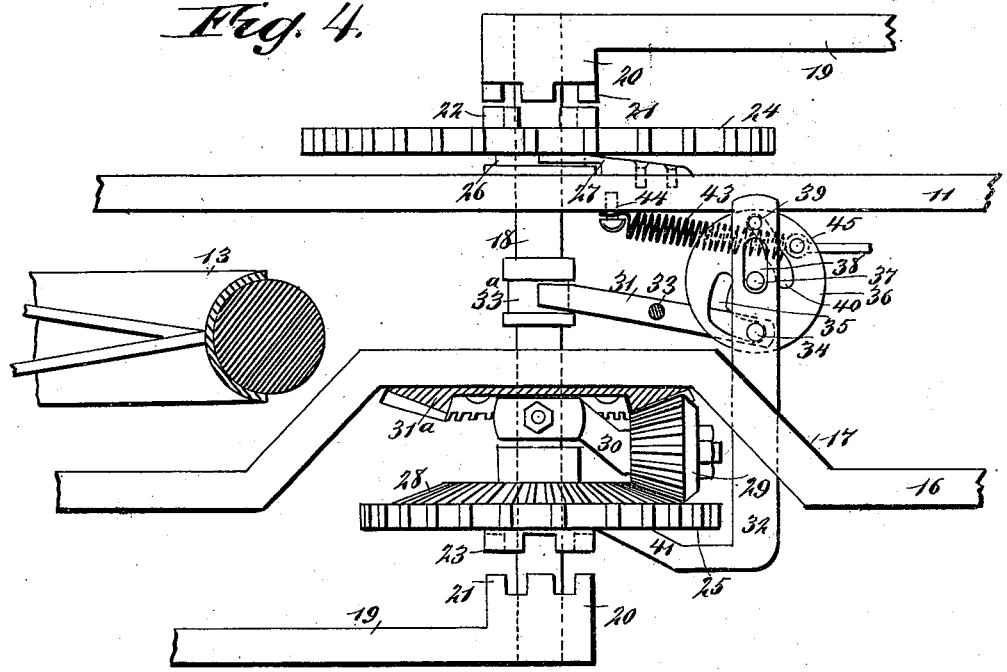
Figure 5:
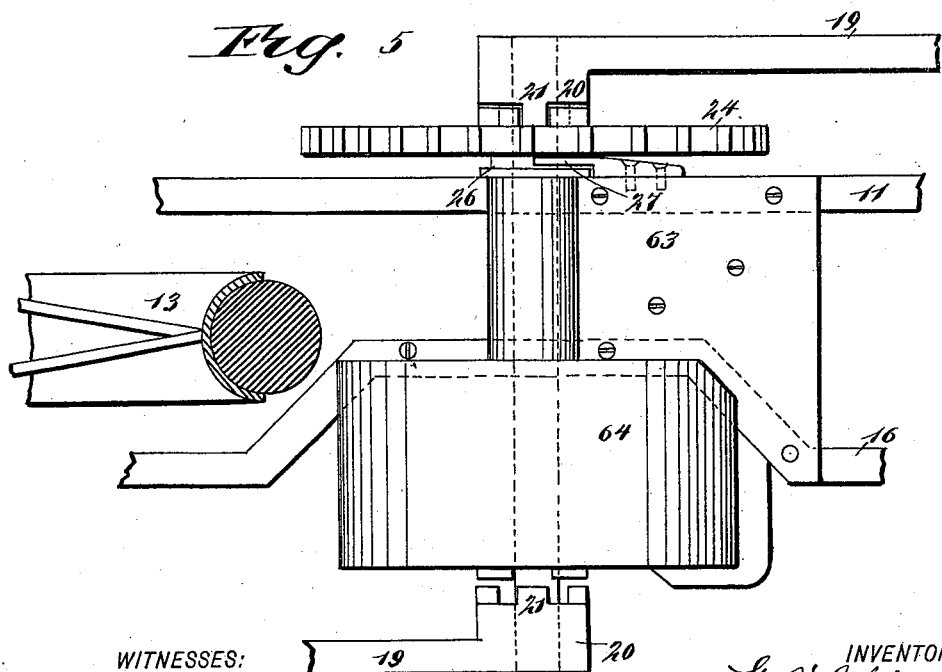

Figure 1 is a broken side elevation of a bicycle provided with our improved driving gear. Fig. 2 is a sectional plan of the driving gear on an enlarged scale and with the gear in its normal position. Fig. 3 is a similar view but with the driving gear shifted so as to work slower and with greater power. Fig. 4 is a similar view with the driving gear in its third position, which is adapted to greatly increase the speed. Fig. 5 is a broken plan of the driving gear with the guards in place to cover the gear wheels. Fig. 6 is a detail plan of the hub of the rear bicycle wheel. Fig. 7 is a broken detail sectional plan of one of the ball bearings of the pedal shaft. Fig. 8 is a broken elevation of the shipping lever which is fulcrumed on the handle bar; and Fig. 9 is a broken perspective view of one of the pedal cranks.

The bicycle 10 is the ordinary safety bicycle and may be of any usual kind, and it is provided with the customary frame 11 carried on the front and rear wheels 12 and 13, these also being of any approved construction. The hub 14 of the rear wheel is provided with a sprocket wheel 15 at each end to connect with the driving sprockets of the gear mechanism, as hereinafter described. The lower portion of the frame 11 is provided with a brace 16 secured rigidly to the frame, as shown in Figs. 2 to 5, this brace having an inwardly bent portion 17 to provide for the contact engagement of the gear wheels on the pedal shaft, as hereinafter described.

Journaled in the frame and in the bent portion of the brace, so as to slide lengthwise and also rotate therein, is a pedal shaft 18 having at the ends the usual pedal cranks 19, which at their inner ends have hubs 20 secured to the shaft, and the hubs have on their inner faces clutch teeth 21 which are adapted to engage similar teeth 22 and 23 on the sprocket wheels 24 and 25 arranged as shown in Figs. 2 to 5 near opposite ends of the pedal shaft; both the sprocket wheels being journaled loosely on the shaft. The sprocket wheel 24 is provided with a grooved hub 26 which is engaged by a spring 27 on the frame 11, and the spring holds the sprocket wheel snug to the frame, so that the pedal shaft may slide readily through it when necessary. The sprocket wheel 25 has its inner side formed into a beveled gear wheel 28 which is adapted to engage a beveled pinion 29 which is journaled on the free end of an arm 30, and the latter is firmly secured to the shaft 18. The pinion 29 is also adapted to engage a beveled gear wheel $31^a$ which is fixed to the bent portion 17 of the brace 16, and when the shaft is revolved and the pinion is in mesh with the gear wheel $31^a$, the pinion will have a circular movement around the shaft and will also turn rapidly on its own axis by reason of its contact with the gear wheel. As a result then, when the pinion is in engagement with both the gear wheels $31^a$ and 28, the circular movement of the pinion, augmented by its axle rotation, will cause it to impart a very rapid movement to the gear wheel 28 and sprocket wheel 25, so that the latter will turn twice to every single revolution of the pedal shaft. The shaft 18 is adapted to move longitudinally in its bearings, and the sprocket wheel 25 is adapted to have an independent longitudinal movement on the shaft, so as to bring it into gear with the pinion 29 when necessary, the two movements being imparted to the shaft and sprocket wheel by means of levers 31 and 32. The lever 31 extends forward from the pedal shaft, is fulcrumed in the center, as shown at 33, and its rear end engages a grooved collar 33ª on the shaft 18. The forward end of the lever 31 has, on its upper side, a pin 34, which enters a cam slot 35 in a cam wheel 36, the latter being pivoted on a pin 37 which enters a slot 38 in the cam wheel. The movement of the lever 31 will be hereinafter traced and described. The lever 32 extends parallel with the shaft 18 and has at one end a pin 39 which enters a cam slot 40 in the cam wheel 36, the pin being on the under side of the lever and the lever preferably on the upper side of the cam wheel. The opposite end of the lever 32 has an inwardly extending arm 41 which engages a groove 42 in the hub of the sprocket wheel 25, and consequently when the lever is moved longitudinally the sprocket wheel is slipped on the shaft 18, and by this means is brought into and out of contact with the pinion 29. The cam wheel 36 is held normally in the position shown in Fig. 2, so as to hold the shaft in position to bring the pinion 29 out of contact with both the gear wheels 31ª and 28 by a spring 43 which is secured at one end to the frame 11, as shown at 44, and at the other to the pin 45 near the periphery of the cam wheel, to which pin the connecting or shipping rod 46 is also pivoted. The connecting rod 46 lies nearly parallel with the lower portion of the frame 11, as shown clearly in Fig. 1, and the front and upper ends of the rod are pivoted to the lower arm of a bell crank lever 47 which is fulcrumed at its elbow, as shown at 48, on the sleeve 49 and the steering fork, and the upper arm of the bell crank connects by a link 50 with one end of a shipping lever 51, which lever lies substantially parallel with the handle bar and is fulcrumed near the center, as shown at 52, in the lower end of the lug 53 which is secured to the handle bar 54. Opposite the free end of the lever 51; that is, the end which is not connected with the bell crank, is a lug 56 which is secured to the handle bar and is provided with a vertical row of hooks 55 which are adapted to engage and hold in place the lever.

The pedal shaft must necessarily be capable of a longitudinal movement, and the form of ball bearing shown in Fig. 7 is therefore well adapted for the shaft. Here the box 59 of the shaft is provided with grooves 60 formed partly in the box and partly in the circular nut 61 which is screwed into one end of the box, and the bearing balls 62 lie in the groove and thus enable the shaft to turn easily and also have the necessary endwise movement.

The gear mechanism is preferably covered by guards 63 and 64 which are secured to the frame 11 and brace 16, as shown in Fig. 5.

The machine is provided with two drive chains, as indicated by dotted lines in Fig. 1, one chain connecting the sprocket wheel 24 with the sprocket wheel 15 on one end of the hub 14 of the rear wheel, and the other chain connecting the opposite sprocket wheel 15 with the smaller driving sprocket wheel 25. With the lever 51 resting in the lower hook 55 the spring 43 draws back the cam wheel 36 so that the lever 31 and the arm 41 extend at nearly right angles to the shaft 18. The hub of the wheel 24 engages the clutch on one of the pedal hubs, and the sprocket wheel 25 is held in a neutral position between the pinion 29 and the adjacent pedal hub. When in this position the power will be transmitted to the rear wheel from the sprocket 24, and this wheel will ordinarily be used. When, however, a slower speed and greater power are desired, the lever 51 is lifted into the second hook 55 and the bell crank 47 is tilted and the shipping rod 46 actuated, so as to tip the cam wheel 36 into the position shown in Fig. 3. This movement causes the cam slot 35 to act on the pin 34 so as to tilt the lever 31, as shown in Fig. 3, and the shaft 18 is moved endwise by the said lever so as to throw the sprocket wheel 24 out of gear, while the hub of the opposite pedal crank is moved into gear with the hub of the sprocket wheel 25. This sprocket wheel is not shifted by the operation above described, owing to the shape of the slot 40 in the cam wheel. It will be seen then that when the pedal shaft is turned, the sprocket wheel 24 will be idle while the sprocket wheel 25 will turn with the shaft and transmit power to the rear wheel. Where great speed is required, the lever 51 is lifted into the third hook and this moves the cam wheel 36 still farther, so that the travel of the pin 39 in the slot 40 moves the lever 32 longitudinally and the arm 41 of the lever pushes the sprocket wheel 25 inward so as to bring the gear wheel 28 into mesh with the pinion 29. When in this position the turning of the pedal shaft causes the pinion to be carried around with the shaft, but it is also turned on its own axis in the manner previously described through contact with the gear wheel 31ª, and it imparts a very rapid movement to the sprocket wheel 25 and consequently to the bicycle.

From the foregoing description, it will be seen that the gear may be shifted into either of the positions shown, by the simple movement of the lever 51, and this may be accomplished without dismounting and without materially slackening the speed of the machine.

Having thus described our invention, we claim as new and desire to secure by Letters Patent—

1. In a driving gear for bicycles, the combination with the pedal shaft, and a driving sprocket wheel loose thereon carrying a gear wheel and having a clutch connection with one of the pedals, of a stationary gear wheel secured to the frame of the machine, a pinion mounted to turn on its own axis and around with the pedal shaft, and means for causing the said pinion to mesh with either the stationary gear wheel or the gear wheel carried by the sprocket wheel, or both, substantially as described.

2. In a driving gear for bicycles, the combination with the pedal shaft, sprocket wheels loose thereon, and pedals having a clutch connection with the sprocket wheels, of a stationary gear wheel carried by the frame, a pinion mounted to turn on its own axis and around with the pedal shaft, and means for moving the pedal shaft endwise, substantially as described.

3. In a driving gear for bicycles, the combination with the pedal shaft, sprocket wheels loose thereon, one of the sprocket wheels carrying a gear wheel, and pedals having a clutch connection with the sprocket wheels, of a stationary wheel, a pinion mounted to turn on its own axis and around with the pedal shaft, and means for causing the pinion to mesh with both the stationary gear wheel and the gear wheel carried by the sprocket wheel and for disengaging the pedals from the sprocket wheels, substantially as described.

4. In a driving gear for bicycles, the combination with the pedal shaft, the pedals secured to the shaft and having clutch teeth on their inner faces, the sprocket wheels of different sizes journaled loosely on the shaft and provided with hubs to engage the pedal hubs, a stationary gear wheel arranged on the shaft, a pinion arranged between the stationary gear wheel and a gear wheel on the side of one of the sprocket wheels, the pinion being held to turn around with the shaft and also on its own axis, and a lever mechanism for moving the shaft longitudinally so as to throw the sprocket wheels into engagement with the hubs of the pedals and the pinion into engagement with the stationary gear wheel and one of the sprocket wheels, substantially as described.

5. In a driving gear for bicycles, the combination with the pedal shaft, the pedal cranks secured to the shaft and provided with toothed hubs, a driving sprocket wheel journaled loosely on the shaft and having a hub to engage one of the pedal hubs, a second sprocket wheel of a different size arranged to engage the opposite pedal hub and provided on its inner side with a gear wheel, a pair of shipping levers fulcrumed near the shaft and arranged to move respectively the shaft and the gear sprocket wheel on the shaft, a swinging lever fulcrumed on the machine frame and operatively connected with the shipping levers, and a fastening device to hold the swinging lever in a desired position, substantially as described.

6. In a driving gear for bicycles, the combination with the pedal shaft, sprocket wheels loose thereon, and pedals having a clutch connection with the sprocket wheels, of a stationary gear wheel, a pinion mounted to turn on its own axis and around with the pedal shaft, a spring actuated cam wheel, a lever engaging the pedal shaft and the cam wheel, and means for operating the cam wheel, substantially as and for the purpose set forth.

7. In a driving gear for bicycles, the combination with the pedal shaft, sprocket wheels loose thereon, one of the sprocket wheels carrying a gear wheel, and pedals having a clutch connection with the sprocket wheels, of a stationary gear wheel, a pinion mounted to turn on its own axis and around with the pedal shaft, a spring actuated cam wheel, a lever engaging the pedal shaft and the cam wheel, a second lever engaging the sprocket wheel carrying the gear wheel, and the cam wheel, and means for operating the said cam wheel, substantially as described.

GEORGE B. ROBINSON.
WILLIAM R. ROBY.

Witnesses:
EDWARD F. WRIGHT,
GEORGE HANESWORTH.